United States Patent [19]

Funabashi et al.

[11] 4,382,879

[45] May 10, 1983

[54] MATERIAL FOR ADSORBING IODINE AND METHOD FOR PREPARING THEREOF

[75] Inventors: Kiyomi Funabashi, Katsuta; Kunio Kamiya, Hitachi; Makoto Kikuchi, Hitachi; Toshio Takagi, Hitachi; Morimasa Hashimoto, Mishima; Mitsuyoshi Ichimura, Numazu, all of Japan

[73] Assignees: Hitachi, Ltd.; Nippon Engelhard, Ltd., both of Tokyo, Japan

[21] Appl. No.: 231,277

[22] Filed: Feb. 4, 1981

[30] Foreign Application Priority Data

Feb. 4, 1980 [JP] Japan .................................. 55-11478

[51] Int. Cl.$^3$ ...................... B01J 20/08; B01J 20/10; B01J 20/32
[52] U.S. Cl. .................................. 252/457; 252/454; 252/459; 252/463; 252/466 J; 55/71
[58] Field of Search .................. 252/454, 477 R, 463, 252/457, 466 J; 55/71, 387; 423/240 S

[56] References Cited

U.S. PATENT DOCUMENTS

| | | | |
|---|---|---|---|
| 2,994,577 | 8/1961 | Silverman | 252/477 R |
| 3,235,512 | 2/1966 | Koepernik | 252/455 R |
| 3,838,554 | 10/1974 | Wilhelm et al. | 252/460 X |
| 3,853,789 | 12/1974 | Warthen et al. | 252/477 R |
| 3,900,427 | 8/1975 | Riley et al. | 252/455 R |
| 3,978,000 | 8/1976 | Schmitt, Jr. et al. | 252/477 R |
| 4,045,539 | 8/1977 | Hirano et al. | 423/240 S |
| 4,070,283 | 1/1978 | Kirkland | 252/477 R |
| 4,277,376 | 7/1981 | Paolasini | 252/455 R |

FOREIGN PATENT DOCUMENTS

1416344 12/1975 United Kingdom ............ 423/204 S

*Primary Examiner*—Carl F. Dees
*Attorney, Agent, or Firm*—Antonelli, Terry & Wands

[57] ABSTRACT

An adsorbing material comprising a porous body having larger pores of a mean pore diameter of 200 to 2000 Å and smaller pores of a mean pore diameter of 40 to 200 Å on the surfaces of the larger pores, said porous body being impregnated with a metal such as silver, copper, etc., or a salt thereof such as silver nitrate, etc., has excellent adsorbing performance for iodine and/or organic iodine compounds under any degree of humidity.

15 Claims, 5 Drawing Figures

MATERIAL FOR ADSORBING IODINE AND METHOD FOR PREPARING THEREOF

This invention relates to a material for adsorbing iodine and/or organic iodine compounds and a process for preparing the same, more particularly to an adsorbing material comprising a porous body impregnated with a substance which readily reacts with iodine and/or organic iodine compounds and a process for preparing the same.

In nuclear power plants, radioactive iodine including elemental iodine ($I_2$) and organic iodine compounds containing as a major component methyl iodide ($CH_3I$) (hereinafter sometimes referred to as simply "iodine" as a whole) is formed as fission products. In order to prevent the release of the iodine into the air, various iodine adsorbents have been developed. Examples of such iodine adsorbents are activated carbon, silver coated silica gel, silver impregnated molecular sieve, etc. But these adsorbents have a problem in that their iodine adsorbing performance is lowered when used under high humidity due to condensation of water in the pores of these adsorbents. In order to solve such a problem, U.S. Pat. No. 3,838,554 discloses a metal salt-impregnated sorption agent comprising a porous body such as amorphous silicic acid having a wide pore distribution spectrum of from 20 to 1000 Angstrom units diameter impregnated with a metal salt such as silver nitrate.

But the present inventors have found after many experiments for the first time that the iodine adsorption performance cannot always be improved sufficiently under various degrees of humidity only by forming pores having a wide distribution of pore diameters.

It is an object of this invention to provide an iodine adsorbent having remarkably high iodine adsorption performance under any degree of humidity, either high or low, and a process for preparing the same.

This invention provides an iodine adsorbing material comprising a porous body having larger pores of a mean pore diameter of 200 to 2000 Å and smaller pores of a mean pore diameter of 40 to 200 Å on the surfaces of the larger pores, said porous body impregnated with a substance which readily reacts with iodine and/or organic iodine compounds.

This invention also provides a process for preparing an iodine adsorbing material which comprises forming particles having smaller pores of a mean pore diameter of 40 to 200 Å, forming a porous body having larger pores of the mean pore diameter of 200 to 2000 Å and smaller pores of the mean pore diameter of 40 to 200 Å on the surfaces of the larger pores by bonding the particles together, and impregnating the porous body with a substance which readily reacts with iodine and/or organic iodine compounds.

The resulting adsorbing material has remarkably high iodine adsorption performance of about 99% under either high humidity or low humidity, and has an iodine adsorption performance of 99.999% at a relative humidity of 70% or lower.

In the attached drawings, FIG. 1 is a characteristic chart illustrating the relationships between the mean pore diameter of the carrier (porous body) having a number of simple pores and the $CH_3I$ removing efficiency of the adsorbing material which is produced by carrying silver on that carrier;

Figure 4:
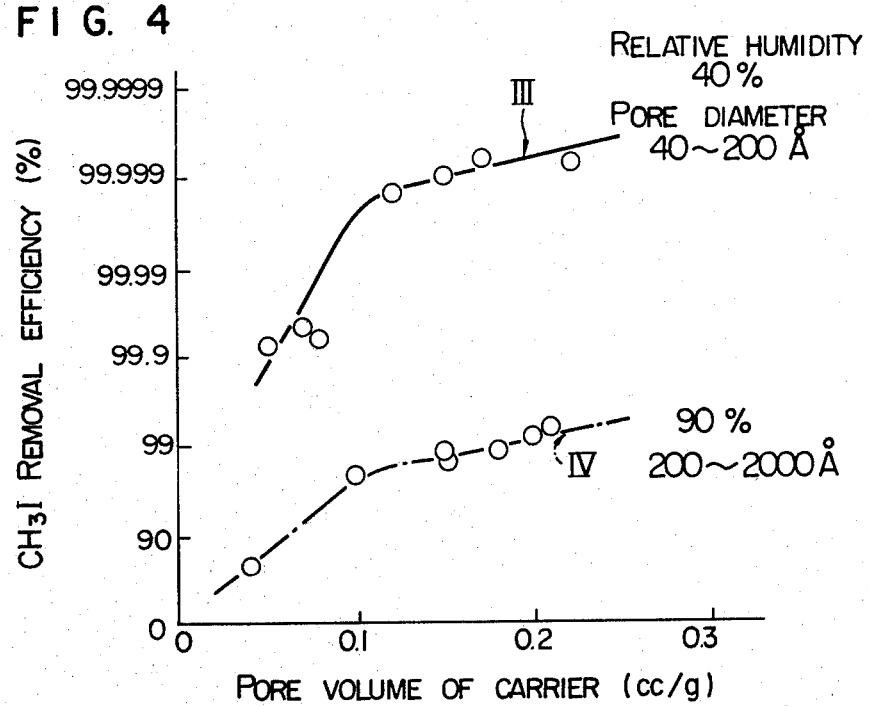
Figure 5:
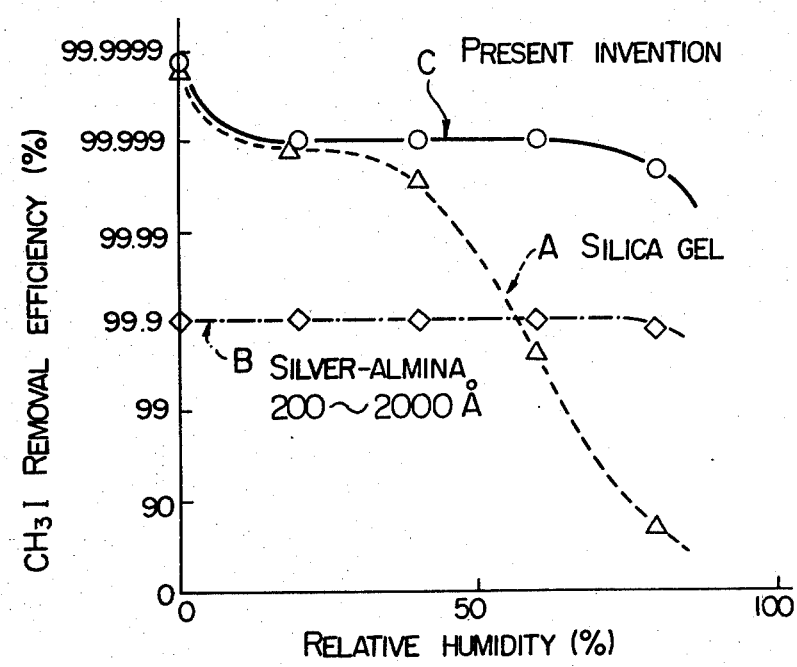

FIG. 4 is a characteristic chart illustrating the relationships between the pore volumes of the smaller pores having the pore diameter of 40 to 200 Å and the larger pores having the pore diameter of 200 to 2000 Å of the alumina carrier, respectively, and the $CH_3I$ removing efficiencies; and FIG. 5 is a characteristic chart illustrating dependencies of the silver impregnated alumina adsorbing material according to the present invention and the adsorbing materials according to the prior art upon the relative humidity.

Figure 1:
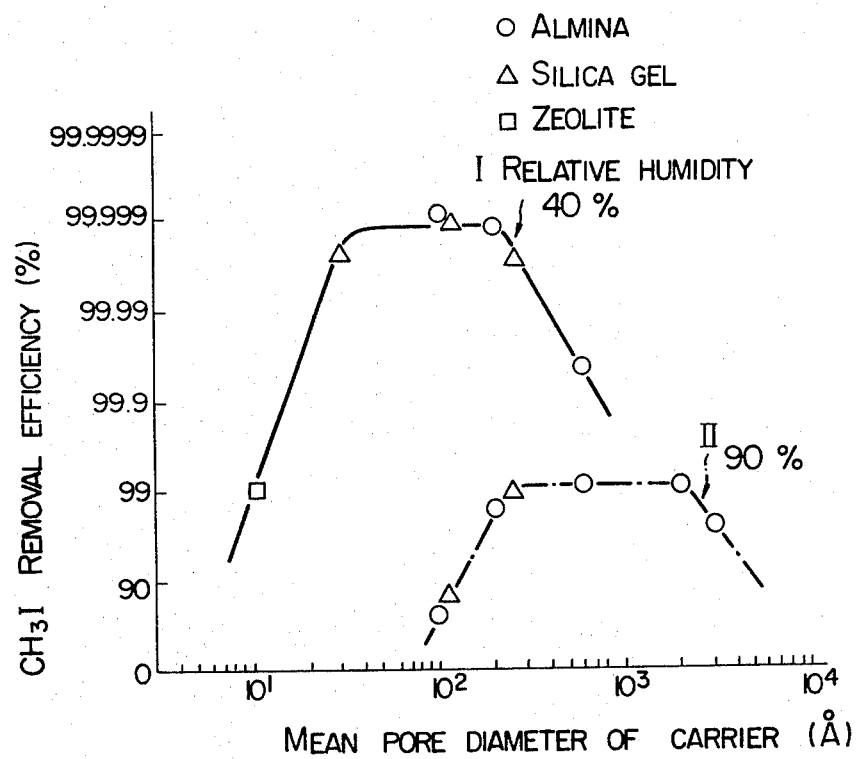

The adsorbing material of the present invention is explained at first referring to FIG. 1.

FIG. 1 illustrates the results of measurements of the methyl iodide ($CH_3I$) removing efficiency of adsorbing materials which are produced by carrying silver in an amount of 0.1 g/g (of the carrier employed), which is one sixth of that of silver zeolite, on a variety of carriers having different mean pore diameters. The measurements of the $CH_3I$ removing efficiency are accomplished by simulating the treatments of gases having high and low humidities. More specifically, an adsorbent layer having a preset thickness is fed at a flow rate of 20 cm/sec with a gas containing $CH_3I$ at a temperature of 30° C. The adsorptivities are measured by varying the relative humidity of the gas to 40% and 90%. The mean pore diameter of the carrier is determined by the known mercury-porosimeter method. The measured results of the $CH_3I$ removing efficiencies are illustrated in FIG. 1. In FIG. 1, circles, triangles and squares indicate the $CH_3I$ removing efficiencies in case alumina, silica gel and zeolite are used as the carrier, respectively. A characteristic curve I illustrates the measured results in the case of the relative humidity of 40%, and a characteristic curve II illustrates the measured results in the case of the relative humidity of 90%. From the characteristic curves of FIG. 1, it is found that the $CH_3I$ removing efficiencies of the adsorbing materials using the carriers of the mean pore diameters ranging from 40 to 200 Å and 200 to 2000 Å are sufficiently high for the low and high humidities, respectively, and that the carriers having the pores of the mean pore diameters of those ranges are effective as the iodine removing adsorbent even they have low silver content. The reason why the $CH_3I$ removing efficiency is decreased for the mean pore diameter below 200 Å in the atmosphere at the high humidity seems to be that the water contained in the gas condenses in the pores thereby to deteriorate the activity of the silver carried. On the other hand, the reason why the $CH_3I$ removing efficiency is decreased for the mean pore diameter above 2000 Å seems to be that the surface area of the carrier is small. On the contrary, the reason why the $CH_3I$ removing efficiency is likewise decreased for the mean pore diameter below 40 Å even in the atmosphere at the low humidity seems to be that a minute amount of water contained in the gas condenses. On the other hand, the reason why the $CH_3I$ removing efficiency is decreased for the mean pore diameter above 200 A seems to be that the surface area of the carrier is reduced.

From the measured results described above, the present invention has been accomplished by finding it sufficient to have the pores of the mean pore diameter of 40 to 200 Å and the pores of the mean pore diameter of 200 to 2000 Å and to form the former pores on the surfaces of the latter pores.

Figure 2:
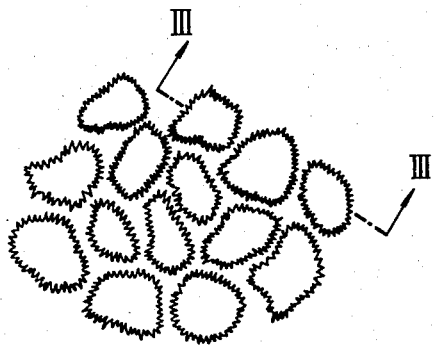
FIG. 2 is a schematic plain view of the carrier of the present invention.
Figure 3:
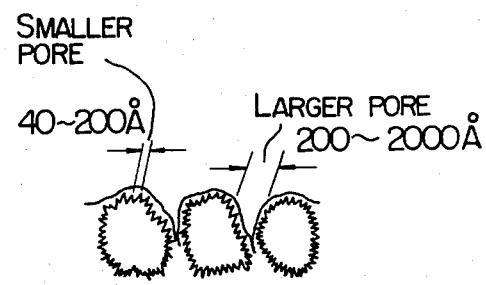
FIG. 3 is a cross sectional view taken along the line III—III of FIG. 2.

That is, the porous body which constitutes the iodine adsorbing material or adsorbent of the present invention has larger pores of the mean pore diameter of 200 to 2000 Å among a number of bonded particles which have smaller pores of the mean pore diameter of 40 to 200 Å on the surfaces of individual particles as shown in FIGS. 2 and 3. The porous body is impregnated with a substance, which readily reacts with iodine and/or organic iodine compounds, such as a metal or a salt thereof in the form of an aqueous solution.

The adsorption mechanism of iodine and/or organic iodine compounds by the adsorbing material of the present invention seems to be as follows. Under low humidity, the substance impregnated on the smaller pores and the larger pores directly contacts with iodine and reacts with iodine. Under high humidity, moisture is absorbed into pores wherein the substance impregnated is covered by water film formed therein. When iodine contacts with the impregnated substance which is dissolved in the water film, it reacts with the substance dissolved. One of the features of the adsorbing mechanism of the adsorbing material of the present invention is that since the smaller pores are present on the surfaces of the larger pores, the moisture absorbed in the smaller pores under high humidity dissolves the substance impregnated and deposited in the smaller pores and releases the substance dissolved to the larger pores through the openings of the smaller pores. In other words, the smaller pores show high adsorptivity under low humidity and when under high humidity, the substance impregnated in the smaller pores which show low adsorptivity under high humidity is released from the smaller pores to the larger pores which have high adsorptivity, that is, the high adsorptivity of the larger pores is used effectively. Such a special adsorption mechanism cannot be obtained by using an adsorbent having a wide distribution range of the mean pore diameters. If adsorbents having larger pores and adsorbents having smaller pores are arranged simply one by one, the substance impregnated in the smaller pores cannot show its effect at all under high humidity.

The following description is concerned with the preparing method of the iodine adsorbing material according to the present invention and with its $CH_3I$ removing efficiency.

By taking up alumina as the carrier (the porous body), first of all, the preparing method of the adsorbing material and the $CH_3I$ removing efficiency will be described in detail.

An alumina carrier is prepared in the following manner. 4-Normal ammonia water is gradually added to an aqueous solution of 10% by weight of aluminum sulfate until a pH of 5 to 10 is attained. This is filtered and rinsed with clean water after it has stood night and day at room temperature. The resultant alumina gel is dried at about 120° C. to give alumina powders. Nitric acid is added in an amount of 25 cc per 1 l of water to 1 kg of these alumina powders, and they are sufficiently admixed by means of a kneader. After that, the resultant mixture is extruded by means of a die having a diameter of 1 mm. After that, the resultant extrusions are dried at 120° C. for 12 hours and then are sintered at 400° to 800° C., preferably 600° C. for 2 hours. The alumina thus sintered is pulverized into particles having a diameter of 0.04 to 0.1 mm by means of a pulverizer. By these processes, there can be obtained particles which have smaller pores of the mean pore diameter ranging from 40 to 200 Å. The mean pore diameter of the smaller pores can be adjusted to the range from 40 to 200 Å by adjusting the sintering temperature. 0.7 Kg of the particles obtained by the pulverization and 0.3 kg of the dried alumina gel obtained before are admixed. The resultant mixture is added in an amount of 30 cc/$H_2O$ l to nitric acid together with 30 g of bentonite and is sufficiently admixed by means of a kneader. After that, this mixture is extruded by means of a die having a diameter of 0.4 mm and is shaped into a round shape by means of a granulator after it has been cut. The resultant round particles are sintered at a temperature of 800° to 1400° C. to produce an alumina carrier having a diameter of 1 to 2 mm in which there are formed larger pores of a mean pore diameter of 200 to 2000 Å among the bonded particles which have smaller pores of a mean pore diameter of 40 to 200 Å. The pore diameter of the larger pores can be adjusted by changing the sintering temperature. The smaller pores are formed on the surfaces of the bonded particles which form the larger pores, so that the smaller pores are connected to the larger pores as shown in FIGS. 2 and 3. These larger pores always have openings on the surface of the alumina carrier.

Silver is impregnated in the alumina carrier particles by the following treatments. 50 Grams of the alumina carrier particles are dipped in 50 cc of 0.1-normal nitric acid and are filtered after they have been held at room temperature for 15 minutes. After that, silver nitrate is added in an amount of 8.2 g/20 cc of $H_2O$, and the alumina carrier particles are dried at about 100° C.

The measured results of the $CH_3I$ removing efficiency of the silver impregnated alumina adsorbing materials of various pore volumes with silver content of 0.1 g/g-carrier, said adsorbing materials being obtained by varying the gel forming pH and the sintering temperature within the aforementioned ranges in the method mentioned above, are tabulated in Table 1 together with the preparing conditions:

TABLE 1

| No. | Preparing conditions | | Volume (cc/g) of smaller pores of 40 to 200 Å of alumina carrier | Removing efficiency (%) at relative humidity of 40% | Volume (cc/g) of larger pores of 200 to 2000 Å of alumina carrier | Removing efficiency (%) at relative humidity of 90% |
|---|---|---|---|---|---|---|
| | Gel forming pH | Sintering temp. (°C.) | | | | |
| 1 | 8.0 | 800 | 0.22 | 99.9991 | 0.15 | 98.4 |
| 2 | 8.5 | 900 | 0.17 | 99.9992 | 0.18 | 98.5 |
| 3 | 7.8 | 1100 | 0.15 | 99.9990 | 0.20 | 99.1 |
| 4 | 7.0 | 1200 | 0.12 | 99.998 | 0.21 | 99.2 |
| 5 | 8.0 | 1200 | 0.08 | 99.92 | 0.15 | 98.6 |
| 6 | 8.5 | 1250 | 0.07 | 99.93 | 0.10 | 97 |
| 7 | 8.0 | 1400 | 0.05 | 99.91 | 0.04 | 70 |

The measuring conditions of the CH$_3$I removing efficiency are the same as those of the case of FIG. 1. The pore volume was determined similarly to the foregoing case by the mercury-porosimeter method. From these results, it is found that there are correlations between the pore volume of the smaller pores of 40 to 200 Å and the CH$_3$I removing efficiency at the relative humidity of 40% and between the pore volume of the larger pores of 200 to 2000 Å and the CH$_3$I removing efficiency at the relative humidity of 90%.

FIG. 4 illustrates the relationships between the removing efficiencies and the pore volumes of the respective adsorbing materials. In FIG. 4, a characteristic curve III indicates the CH$_3$I removing efficiency at the relative humidity of 40% against the pore volume of the smaller pores of 40 to 200 Å, and a characteristic curve IV indicates the CH$_3$I removing efficiency at the relative humidity of 90% against the pore volume of the larger pores of 200 to 2000 Å. From this drawing, it is found that, when the pore volume of the smaller pores having the pore diameter of 40 to 200 Å becomes lower than 0.1 cc/g at the relative humidity of 40%, the CH$_3$I removing efficiency is so deteriorated as to provide the undesired iodine adsorbing material. At the relative humidity of 90%, on the other hand, it is likewise found that the deterioration in the CH$_3$I removing efficiency becomes remarkable when the pore volume of the larger pores having the pore diameter of 200 to 2000 Å becomes lower than 0.1 cc/g.

As mentioned above, when the various adsorbing materials are prepared to clarify the relationships between their physical properties and CH$_3$I removing efficiencies, the carrier, which is formed with both the smaller pores having the mean pore diameter of 40 to 200 Å with the pore volume of the smaller pores having a pore diameter in the range of 40 to 200 Å of at least 0.1 cc/g and the larger pores having the mean pore diameter of 200 to 2000 Å with the pore volume of the larger pores having a pore diameter in the range of 200 to 2000 Å of at least 0.1 cc/g, is especially effective for the iodine adsorbing material.

The effects of the present invention will be explained below. First of all, the alumina carrier particles are prepared under the conditions of the pH of 8.0 at the alumina gel forming step and of the temperature of 800° C. at the alumina sintering step in the aforementioned adsorbent producing method so as to possess both the smaller pores having the mean pore diameter of 40 to 200 Å with the pore volume of 0.22 cc/g and the larger pores having the mean pore diameter of 200 to 2000 Å with the pore volume of 0.15 cc/g, followed by impregnation of silver in the form of silver nitrate in an amount of 0.1 g/g-carrier, thus producing the silver impregnated alumina adsorbing material.

FIG. 5 illustrates the dependencies of the CH$_3$I removing efficiencies of both the silver impregnated alumina adsorbing material of the present invention as mentioned above and conventional adsorbing materials, which are produced by carrying silver in an amount of 0.1 g/g-carrier in the form of silver nitrate on conventional carriers having a number of simple pores, upon the relative humidity. The measuring conditions of the CH$_3$I removing efficiencies are the same as those of the aforementioned case (gas flow rate 20 cm/sec, gas temperature 30° C.). In FIG. 5, a characteristic curve A illustrates the dependency of a conventional adsorbing material, which is produced by carrying silver on silica gel having a mean pore diameter less than 200 Å, a characteristic curve B illustrates the dependency of another conventional adsorbing material, which is produced by carrying silver on alumina having a mean pore diameter ranging from 200 to 2000 Å, and a characteristic curve C illustrates the dependency of the adsorbing material which is produced by the present invention. In the curve C, as the carrier, there are used those having a layer thickness of 5 cm, a specific surface of 62 m$^2$/g (BET method), a porosity of 53% and a particle size of 0.4 to 2.0 mm. From FIG. 5, it is found that the CH$_3$I removing efficiency of the silver impregnated alumina adsorbing material according to the present invention is higher than those of the conventional adsorbing materials. Here, because of the large surface area, the adsorbing material, as indicated by the characteristic curve A, has a high CH$_3$I removing efficiency in the atmosphere of a low humidity but has its CH$_3$I removing efficiency deteriorated in the atmosphere of a high humidity because the reaction between silver and iodine is suppressed by the moisture adsorption. On the other hand, since the adsorbing material of the characteristic curve B has a small surface area although it has a large pore diameter and a low moisture adsorption, it has a low CH$_3$I removing efficiency in the atmosphere of a low humidity. On the contrary, the adsorbing material according to the present invention can procure the surface area necessary for the reaction while restraining the moisture adsorption because it is so constructed as to have the smaller pores on the surfaces of the larger pores. As a result, by using the adsorbing material according to the present invention, a high iodine removing efficiency can be enjoyed over a wide humidity range. Moreover, there can be attained an effect that the silver content in the carrier can be made lower than that (i.e., 0.6 g/g-carrier) of the silver impregnated zeolite adsorbing material according to the prior art.

Although alumina and silver were used as the carrier and the carried metal, respectively, in the respective embodiments of the present invention, the present invention is not limited thereto. Even if another carriers such as silica gel, activated carbon, etc., organic plastics such as polystyrene, etc., can be used, specifically, the iodine removing efficiency can be enhanced similarly to the aforementioned alumina by adjusting the pore volumes of the pores having the diameters of 40 to 200 Å and 200 to 2000 Å larger than 0.1 cc/g.

Iodine adsorbing materials can also be prepared by using silica gel, for example, as follows. Water glass (which is composed of silicon oxide and sodium oxide) in an amount of 500 cc is dissolved in 1 l of water. On the other hand, an aqueous solution containing hydrochloric acid with a concentration of 245 cc/300 cc of H$_2$O is prepared. These two liquids are allowed to stand at room temperature for about 1 hour after they have been admixed. Gel is formed in the mixture liquid by that process. This gel is then treated with an aqueous solution of 1-normal ammonium nitrate and is rinsed. After that, the gel rinsed is dried at 150° C. for 4 hours and is sintered at 400° C. for 2 hours. The silica pellets sintered are pulverized into particles having a size of 0.04 to 0.1 mm by means of a pulverizer. The particles thus obtained by the pulverization have smaller pores. 0.7 Kg of the particles obtained by the pulverization and 0.3 kg of dried silica gel are admixed. The resultant mixture is added to hydrochloric acid with a concentration of 30 cc/1-H$_2$O and is sintered at a temperature of 500° to 1000° C. Then, there are prepared silica gel carrier particles which are constructed so as to have the smaller pores having the mean pore diameter of 40 to 200 Å on the surfaces of the larger pores having the mean pore diameter of 200 to 2000 Å and which have pore volumes of both the smaller pores of the pore diameter of 40 to 200 Å and the larger pores of the pore diameter of 200 to 2000 Å larger than 0.1 cc/g, respectively. These pore volumes of the carrier are dependent mainly on the sintering temperature. Silver is carried on that carrier in the following manner. 100 Grams of the silica gel carrier particles are dipped in 100 cc of 0.1-normal nitric acid and are filtered after they have been allowed to stand at room temperature for 15 minutes. After that, silver nitrate with a concentration of 16.4 g/40 cc of $H_2O$ is added thereto, and those particles are dried at 100° C. The adsorbing material using the silica gel carrier thus prepared achieves similar effects to those of the adsorbing material using the alumina carrier.

Further, the form of the carrier need not be limited to particles and can give similar effects even if it has a unitary construction such as honeycomb.

In addition to silver, Cu, Pb, Zn, Cd, Ni, Co are effective as the iodine adsorptive material, i.e., the substance which readily reacts with iodine and/or organic iodine compounds. These metals or their salts (e.g., their nitrates) can be carried on the porous body such as the alumina carrier, which is prepared under the conditions as mentioned as to No. 1 of Table 1. The $CH_3I$ removing efficiencies of those adsorbing materials measured have revealed that, in an atmosphere of high humidity, they are about six times as high as that of the adsorbing material, which was produced by carrying one of those metals or salts thereof on an alumina carrier having a number of simple pores with a mean pore diameter smaller than 200 Å, and in an atmosphere of low humidity, they are about two times as high as that of the carrier having a mean pore diameter larger than 200 Å. The iodine removing performance relatively varies in accordance with the kind of the metal used. Similarly to the case of silver, a high $CH_3I$ removing efficiency can be achieved when such a carrier as having smaller pores of the pore diameter of 40 to 200 Å on the surfaces of larger pores of the pore diameter of 200 to 2000 Å, both the smaller and larger pores having the pore volumes larger than 0.1 cc/g. Further, the amount of the metal supported on the carrier can be reduced.

Although the carrier preparing method and the metal carrying method have been described in the foregoing embodiments and so on, the present invention should not be limited to these descriptions and can adopt various methods in accordance with the kind of carrier to be used. For example, although the alumina carrier is prepared by the neutral precipitation of aluminum nitrate with ammonia water in the above-mentioned embodiment, it can also be prepared by hydrolysis of sodium aluminate or by the thermal gelation of basic aluminum sulfate.

A metal nitrate such as silver nitrate, copper nitrate, lead nitrate, zinc nitrate, cadmium nitrate, nickel nitrate, cobalt nitrate, etc., is more effective as the substance which readily reacts with iodine among metals or salts thereof considering the producing process thereof, particularly the impregnating step, although chlorides, carbonates, bromides, and oxides of the metals mentioned above can also be used.

As to the removal of iodine, on the other hand, the $CH_3I$ removing efficiency of the silver nitrate impregnated alumina adsorbing material is about three times or more as high as those of other metal impregnated alumina adsorbing materials. Thus, silver nitrate is especially effective as the substance which readily reacts with iodine. Further, the conventional silver impregnated alumina having a mean pore diameter of 600 Å generates separation of the silver impregnated in a high humidity due to wetting with water, but the silver impregnated alumina according to the present invention does not cause separation of the silver impregnated due to its silver holding force strengthened by the smaller pores.

The adsorbing material according to the present invention can remove to a satisfactory extent not only radioactive iodine from waste gases in nuclear plants but also sulfur dioxide gas or nitrogen oxides from waste gases over a wide humidity range.

As mentioned above, according to the present invention, impurities can be highly efficiently removed from atmospheres over a wide humidity range.

What is claimed is:

1. An adsorbent for at least iodine and/or organic iodine compounds comprising a porous body made of a material selected from the group consisting of alumina and silica gel, having larger pores of a mean pore diameter of 200 to 2000 Å and smaller pores of a mean pore diameter of 40 to 200 Å on the surfaces of the larger pores, said porous body being impregnated with a substance which readily reacts with iodine and/or organic iodine compounds.

2. An adsorbent according to claim 1, wherein the substance which readily reacts with iodine and/or organic iodine compounds is a metal or a salt thereof and is impregnated in the form of an aqueous solution thereof.

3. An adsorbent according to claim 2, wherein the metal is silver, copper, lead, zinc, cadmium, nickel or cobalt.

4. An adsorbent according to claim 2, wherein the metal salt is a nitrate of silver, copper, lead, zinc, cadmium, nickel or cobalt.

5. An adsorbent according to claim 1, 2, 3 or 4, wherein pore volume of the smaller pores having a pore diameter of 40 to 200 Å is 0.1 cc or more per gram of the porous body.

6. An adsorbent according to claim 1, 2, 3 or 4, wherein pore volume of the larger pores having a pore diameter of 200 to 2000 Å is 0.1 cc or more per gram of the porous body.

7. An adsorbent according to claim 6, wherein pore volume of the smaller pores having a pore diameter of 40 to 200 Å is 0.1 cc or more per gram of the porous body.

8. An adsorbent according to claim 1, wherein the porous body is made of alumina.

9. A process for preparing an adsorbent for at least iodine and/or organic iodine compounds which comprises a first step of forming particles having smaller pores of a mean pore diameter of 40 to 200 Å, wherein the starting material for forming the particles is selected from the group consisting of alumina and silica gel, a second step of forming a porous body having larger pores of a mean pore diameter of 200 to 2000 Å and smaller pores of a mean pore diameter of 40 to 200 Å on the surfaces of the larger pores by bonding the particles obtained in the first step together, and a third step of impregnating the porous body with a substance which readily reacts with iodine and/or organic iodine compounds.

10. A process for preparing an adsorbent according to claim 9, wherein the first step comprises drying a powder of the starting material, sintering the dried material at a prescribed temperature and pulverizing the sintered material to form particles having smaller pores of a mean pore diameter of 40 to 200 Å.

11. A process for preparing an adsorbent according to claim 9 or 10, wherein the second step includes procedures of granulating the particles obtained in the first step and sintering the granulated material at a prescribed temperature to form a porous body having larger pores of a mean pore diameter of 200 to 2000 Å and smaller pores of a mean pore diameter of 40 to 200 Å on the surfaces of the larger pores.

12. A process for preparing an adsorbent according to claim 9, wherein the substance which readily reacts with iodine and/or organic iodine compounds is a metal or a salt thereof in the form of an aqueous solution.

13. A process for preparing an adsorbent according to claim 12, wherein the metal or the salt thereof is silver, copper, lead, zinc, cadmium, nickel or cobalt or a nitrate of these metals.

14. An adsorbent according to claim 1, wherein said porous body is in particulate form.

15. An adsorbent according to claim 1, wherein said porous body is in the shape of a honeycomb.

* * * * *